United States Patent [19]

Balkwill et al.

[11] 4,296,870
[45] * Oct. 27, 1981

[54] COVERS FOR ELECTRICAL BOXES

[76] Inventors: G. Russell Balkwill, 2429 Howard Ave., Windsor, Ontario, Canada, N8X 3Y5; Jules P. Robinet, 2865 Virginia Park, Windsor, Ontario, Canada, N9E 2B8; John F. Tamasovics, 2530 Todd La., Windsor, Ontario, Canada, N9H 1K5

[*] Notice: The portion of the term of this patent subsequent to Jun. 19, 1996, has been disclaimed.

[21] Appl. No.: 47,793

[22] Filed: Jun. 12, 1979

Related U.S. Application Data

[63] Continuation-in-part of Ser. No. 36,436, May 7, 1979, abandoned, which is a continuation of Ser. No. 908,223, May 22, 1978, Pat. No. 4,158,420.

[51] Int. Cl.³ .............................................. H02G 3/08
[52] U.S. Cl. ..................................... 220/3.3; 220/3.8; 220/3.92; 220/3.94; 174/57
[58] Field of Search ............... 220/3.92, 3.94, 3.2, 220/3.3, 3.4, 3.5, 3.6; 174/57; 52/220, 221

[56] References Cited

U.S. PATENT DOCUMENTS

| | | | |
|---|---|---|---|
| 2,997,520 | 8/1961 | Kinsman | 220/3.8 |
| 3,126,160 | 3/1964 | Berger | 220/3.94 |
| 3,622,029 | 11/1971 | Ware | 220/3.94 |
| 3,690,501 | 9/1972 | Ware | 220/3.94 |
| 3,892,911 | 7/1975 | Codrino | 220/3.94 |
| 4,158,420 | 6/1979 | Balkwill et al. | 220/3.92 |
| 4,167,196 | 9/1979 | Morris | 220/3.8 |

FOREIGN PATENT DOCUMENTS

| | | | |
|---|---|---|---|
| 2038820 | 2/1922 | Fed. Rep. of Germany | 220/3.2 |
| 1077870 | 8/1967 | United Kingdom | 220/3.92 |

Primary Examiner—Joseph Man-Fu Moy
Attorney, Agent, or Firm—Allen D. Gutchess, Jr.

[57] ABSTRACT

A cover is provided for an electrical box, particularly when installed in an outside wall or in a ceiling, above which is a cooler space. The cover extends around all of the electrical box except the open face thereof and has a slanted flange which contacts and seals against the back surface of the wall or ceiling in which the box is mounted. The cover prevents cold air from entering the building through or around the box and heated air from escaping from the interior of the building. The cover also prevents water or moisture from entering the box from the outside. The cover has means for varying the distance the open face of the box extends beyond the slanted flange so as to accommodate walls or ceilings of different thicknesses. The cover also can be specifically designed to receive particular shapes of electrical boxes including a plurality of boxes.

14 Claims, 10 Drawing Figures

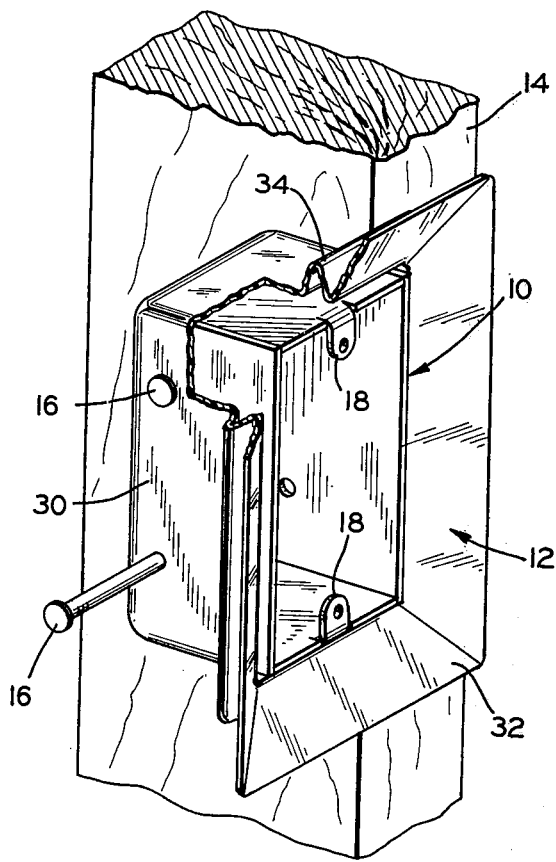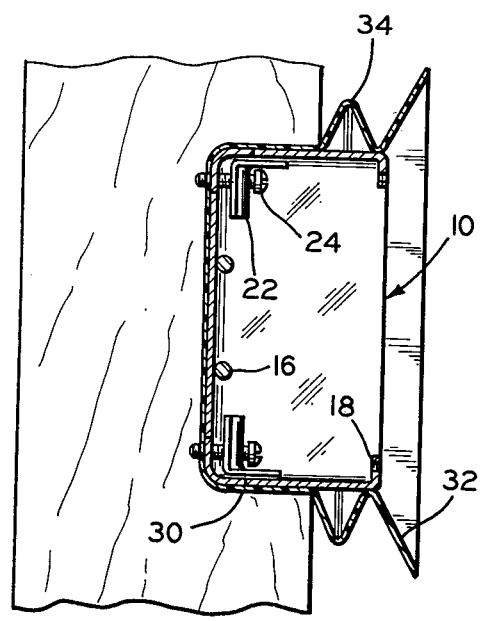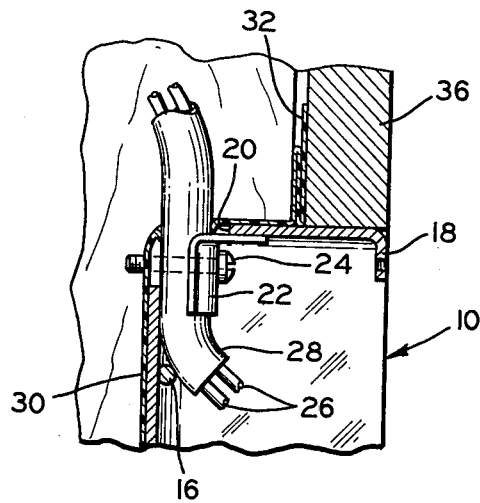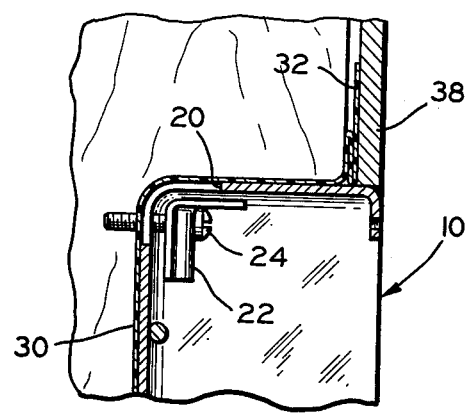
FIG. 1
FIG. 2
FIG. 3
FIG. 4

COVERS FOR ELECTRICAL BOXES

This application is a continuation-in-part of our co-pending application Ser. No. 36,436, now abandoned, filed on May 7, 1979, which is a continuation of our earlier application Ser. No. 908,223, filed on May 22, 1978, now U.S. Pat. No. 4,158,420.

This invention relates to a cover for an electrical box which prevents cold air from entering and heated air from escaping therethrough and therearound and also prevents water and moisture from entering.

At the present, electrical boxes are simply installed in an opening in a wall or ceiling with the box nailed to a stud or with various fastening flanges or hangers employed. In such instances, cold air, particularly under windy conditions, can enter the building through the various openings in the electrical box, and, frequently, around the box through the opening in the wall or ceiling. Similarly, heated air can escape in the opposite direction. In addition, water or moisture can enter the box from the outside and cause short circuits, resulting in fires or electrocutions.

The present invention provides a cover for an electrical box which extends completely around the side walls and back of the box and has a flange slanting away from the cover so that the peripheral edge of the flange can tightly contact the back surface of the wall or ceiling in which the box is mounted. In this manner, air and water or moisture are prevented from entering through the box itself and also through the opening in the wall or ceiling in which the box is mounted. Similarly, heated air is prevented from escaping.

In one form of the invention, the cover is molded directly on the electrical box and has a curved portion extending away from the box near the open face of the box. The slanted flange is then connected to the curved portion which enables the flange to be moved toward and away from the open face of the box. Thus, for example, when paneling is used, the open face of the box can extend a short distance beyond the flange, such as one-quarter inch. When plaster board or wall board is employed, the open face of the box can extend farther beyond the flange, such as one-half inch. For plastered walls, the open face can extend even farther beyond the flange, such as three-quarters inch.

In another form, the cover can be specially shaped to fit an electrical box having a functionally-integral fastening flange extending rearwardly from one side thereof. The cover has a hollow projection which receives the fastening flange and enables this flange to extend into the projection varying distances to vary the extent to which the open face of the box extends beyond the slanted flange of the cover.

In still another form, the cover can be designed to receive a multiplicity of electrical boxes, such as switch boxes. In such an instance, the cover can be equipped with projections to back up the electrical boxes and control the extent to which the open faces extend beyond the slanted flange, which is common to all of the covers.

It is, therefore, a principal object of the invention to provide an improved air and moisture cover for electrical boxes to prevent the passage of air and moisture through and around the box.

Another object of the invention is to provide a cover for an electrical box with means to adjust the open face of the box relative to a slanted flange of the cover.

Many other objects and advantages of the invention will be apparent from the following detailed description of preferred embodiments thereof, reference being made to the accompanying drawings, in which:

FIG. 1 is a view in perspective, with parts broken away, of an electrical outlet box with a cover embodying the invention extending therearound, with the combination molded together and fastened to a stud;

FIG. 2 is a view in vertical cross section taken through the box and cover of FIG. 1;

FIG. 3 is a fragmentary view of the box and cover in a completed installation;

FIG. 4 is a view similar to FIG. 3 but showing the box and cover installed in a thinner wall;

Figure 5:
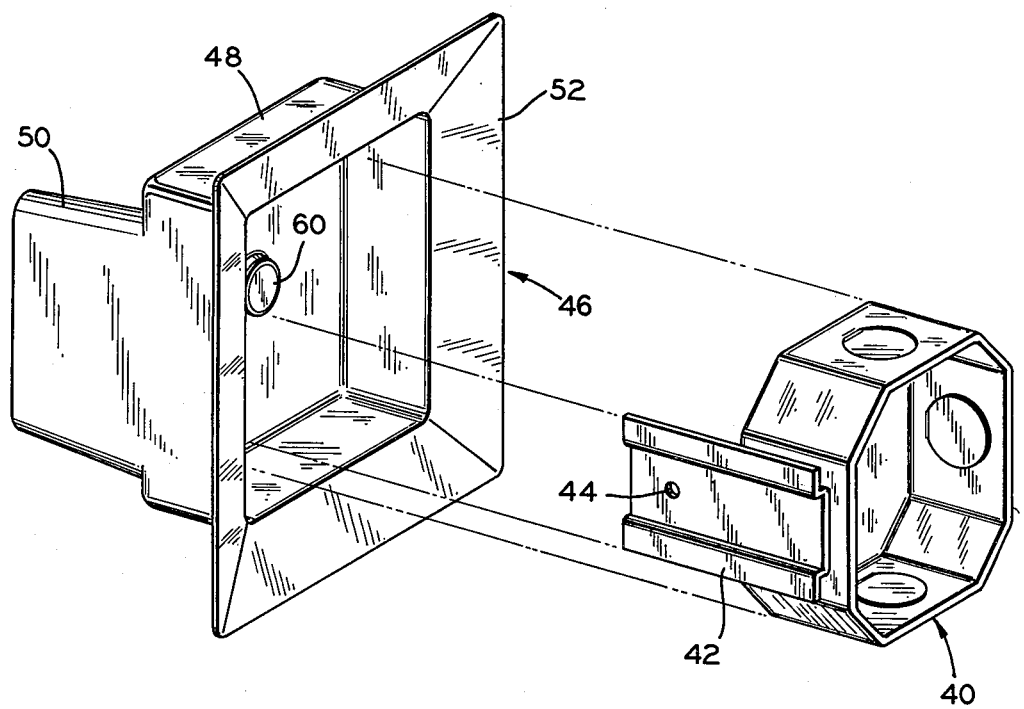
FIG. 5 is an exploded view in perspective of another embodiment of an electrical box with a fastening flange and a cover designed to fit over that box.

Referring to the drawings, and particularly to FIGS. 1-4, an electrical outlet box 10 is shown with a cover 12 and affixed to a stud or other structural member 14 by nails 16, in this instance. The electrical box is of a substantially conventional design, including ears 18 and holes 20 (FIG. 3) formed when knockout plugs are removed. Wire clamps 22 and screws 24 hold wires 26 having insulation 28.

The cover 12 has a receptacle 30 molded directly on the electrical box 10 and functionally integral therewith. The receptacle 30 covers the entire back of the box along with approximately two-thirds of the side walls. The cover also includes a slanted flange 32 which slants outwardly from the electrical box 10 and tightly engages the back surface of a wall or ceiling in which the electrical box is mounted. The slanted flange 32 is connected to the receptacle 30 by a curved portion or bellows 34. This curved portion enables the slanted flange 32 to be moved toward and away from the open side of the box 10 to vary the distance the open face extends beyond the flange. Thus, in FIG. 3, the cover 12 is shown with the open face of the box 10 extending well beyond the flange 32, about three-quarters of an inch. This is the position when the electrical box is to be mounted in a plastered wall 36. In FIG. 4, the flange 32 is much closer to the open face of the electrical box 10, being back only about one quarter inch. This is the position when the box is mounted in a thin panelled wall 38. In between, the open face of the box can project about one-half inch, for plaster board or dry wall.

The cover 12 is of plastic material about 0.030 inch to 0.050 inch thick, and preferably about 0.040 inch. However, the curved portion 34 can be even thinner so that if part of the curved portion 34 and the flange 32 are between the wall and the stud 14, the amount of thickness is not objectionable. Also, the plastic material is preferably transparent or translucent so that an electrician can see the nail holes in the electrical box 10 through the receptacle 30 of the cover 12. The plastic material should also be flexible and substantially uninflammable, or at least not readily prone to burn.

In installing the electrical box 10 with the cover 12 molded thereon, they are positioned with the open face of the electrical box the desired distance beyond the front edge of the stud 14. The nails 16 are then driven through the cover and box and into the stud. Where the wires 26 are to enter the box, the knockout plug was previously removed to leave the opening 20 and the receptacle 30 is then pierced with a screwdriver or similar tool. The wires 26, preferably with the insulation 28 thereon, are then pushed through the receptacle aperture and through the opening 20 of the box 10. The nature of the plastic material employed in the cover 12 is such that the plastic of the receptacle 30 snugly fits around the insulation 28 of the wires 26 to provide a substantially air and moisture proof point of entry through the cover.

Figure 6:
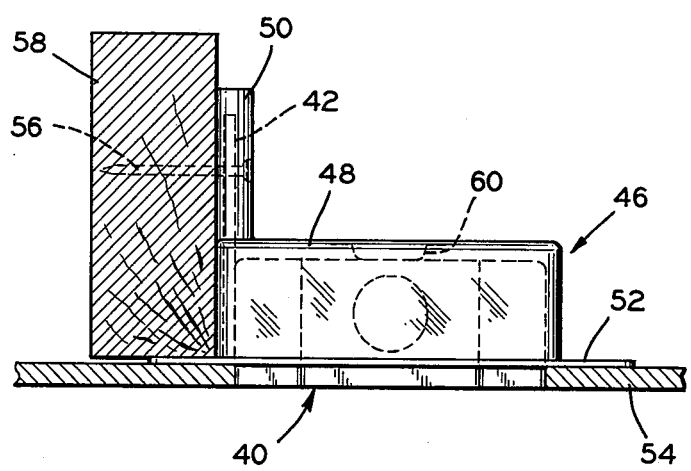
FIG. 6 is a somewhat schematic view in cross section of the electrical box and cover of FIG. 5 installed in a thin ceiling.
Figure 7:
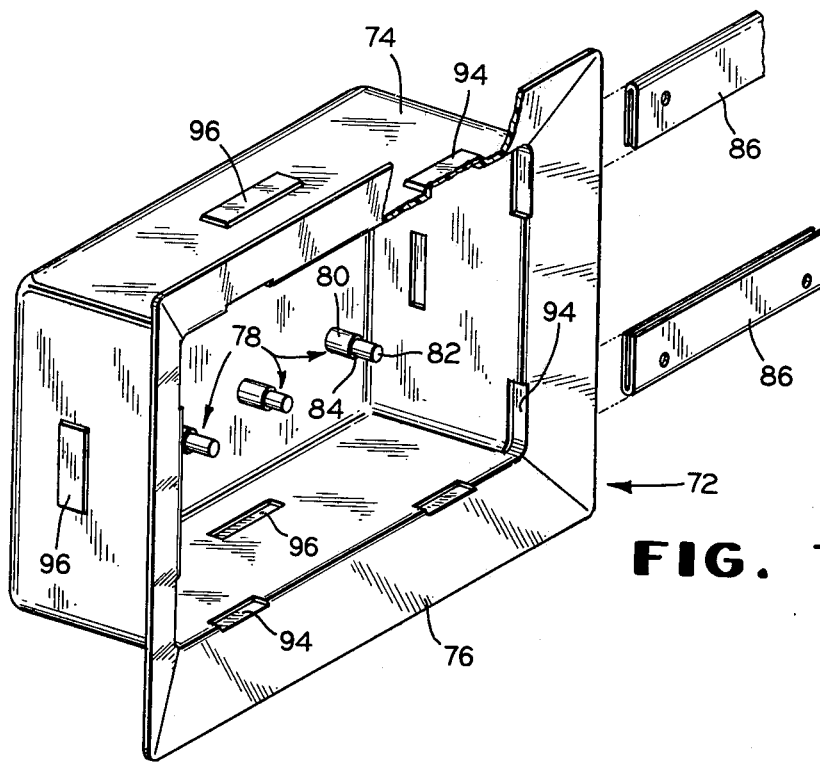
FIG. 7 is an exploded view in perspective of an electrical box cover and straps designed for two or more boxes, with parts broken away and with parts in section.

Referring to FIGS. 5 and 6, an octagonal electrical box is indicated at 40 and includes a fastening flange 42 affixed thereto, extending rearwardly from an open face thereof, and being provided with at least one nail hole 44.

An electrical box cover 46 is specifically designed to fit this type of electrical box. The cover has a receptacle 48 to receive the side walls and back of the box 40 and includes a tapered, rearwardly-extending, hollow projection 50 which is structurally integral with the receptacle. The cover 46 also includes a slanted flange 52 which slants outwardly from the electrical box 40 and tightly engages the back surface of a wall or ceiling 54 in which the electrical box is mounted.

The electrical box 40 is positioned in the cover 46 with the hollow projection 50 enabling the fastening flange 42 to extend therein a desired distance such that the open face of the box can project a desired distance beyond the slanted flange 52 so as to be adaptable for plastered walls, wall board or dry wall, and paneling, as before. When properly adjusted, a nail 56 can be driven through a wall of the projection 50, the flange 42, and the other wall of the projection 50 into a joist or other structural member 58.

The receptacle 48 can also be provided with a cylindrical recess 60 as viewed from the back of the cover 46 which projects toward the electrical box. As such, the cover is readily adaptable for use with octagonal boxes to be used with variable length bar hangers having studs, usually five-eights inch in diameter, and wing nuts. The wall of the recess 60 thereby tends to snugly contact the stud of the bar hanger and more effectively act as a air and moisture barrier.

Figure 8:
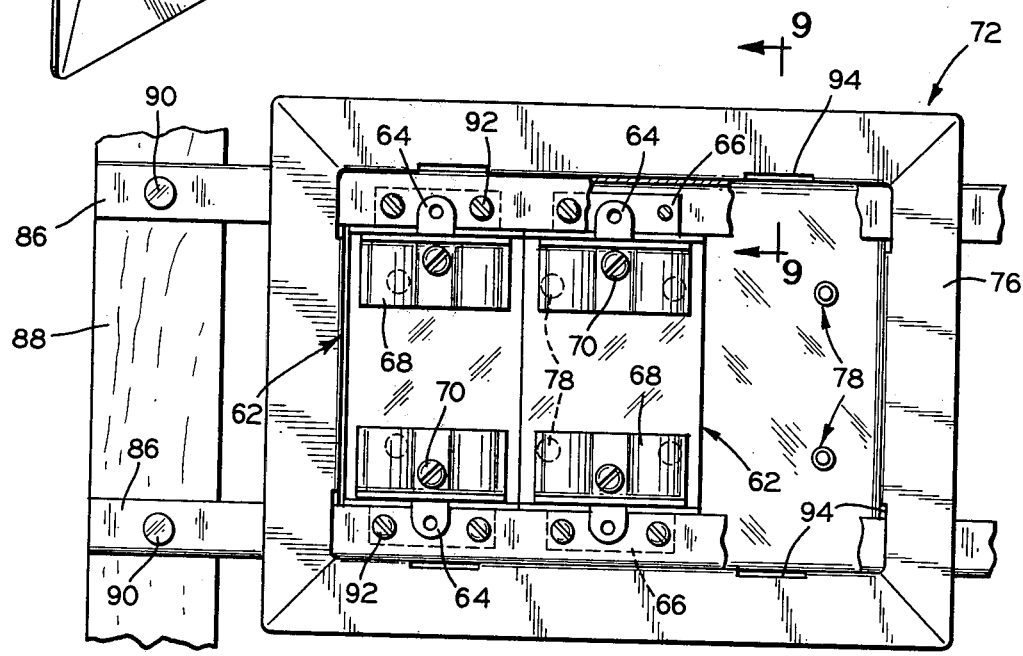
FIG. 8 is a fragmentary front view in elevation of the cover of FIG. 7 with electrical boxes installed therein.
Figure 9:
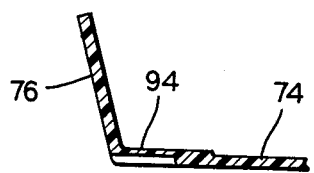
FIG. 9 is a fragmentary view in cross section taken along the line 9—9 of FIG. 8.
Figure 10:
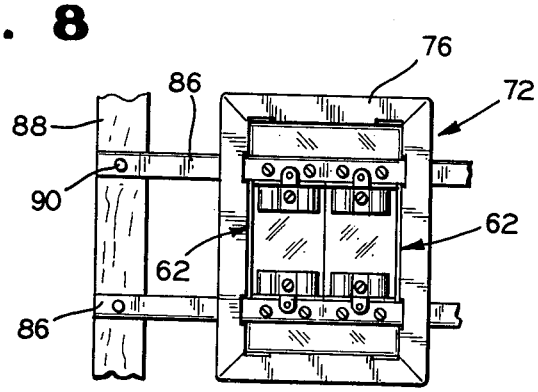
FIG. 10 is a somewhat schematic view in elevation similar to FIG. 8 showing the cover used with electrical boxes in a different position.

Referring to FIGS. 7–10, a plurality of electrical boxes, particularly switch boxes, indicated at 62 can be adjacent or ganged together and used in a group of three, as shown in FIG. 8, or a pair as shown in FIG. 10. The boxes have outwardly extending ears 64 to receive switch plates or the like and flanges 64 which can be adjusted toward and away from the open faces of the electrical boxes 62. The boxes 62 also have the usual wire clamps 68 and screws 70, and knock out plugs (not shown).

A vapor barrier cover for a plurality of the electrical boxes 62 is indicated at 72. The cover 72 has a receptacle 74 extending around the backs and sides of the electrical boxes 62. The cover 72 also has a slanted flange 76 slanting outwardly and away from the electrical boxes to tightly contact the back surface of the wall or the like, as before. The receptacle 74 also has outwardly extending projections 78 with larger diameter base portions 80 and smaller diameter tip portions 82 forming shoulders 84 therebetween.

When the electrical boxes 62 are inserted in the receptacle 74 with the backs of the boxes against the ends of the projecting tips 82, the boxes will extend from the cover 72 about three-quarters of an inch so as to be effectively positioned for plastered walls. When the tips 82 are cut off at the shoulders 84, the boxes 62 will then extend about one-half inch from the cover so as to be suitably positioned for dry wall or plaster board. Finally, when the projections 78 are removed by cutting the base portions 80 at the back wall of the receptacle 74, the boxes 62 will extend about one-quarter inch, which is suitable for panelled walls.

When the boxes are positioned in the cover 72 at the desired depth, mounting straps 86 are extended through the side walls of the receptacle 74 of the cover 72 and between the ears 64 and the adjustable flanges 66. The boxes 62 can then be snugly held with the flanges pressing against the straps 86 and the backs of the boxes being urged against the projections 78, or portions thereof which are not cut away, or against the back of the receptacle 74 itself. The boxes 62 can also be fastened to the straps by screws 92. The straps 86 are then suitably fastened to studs or other structural members 88 by nails 90 or other suitable fasteners.

To facilitate the penetration of the straps 86 through the cover 72, the edges of the sides of the receptacle 74, where they meet the slanted flange 76, have molded elongate thin portions or areas 94. The plastic material of the cover still snugly fits around the straps 86 when in the position to minimize the passage of air or moisture therearound.

The thin portions 94 are also molded into the other top walls of the receptacle 74 of the cover 72. The cover 72 can then be turned 90°, as shown in FIG. 10, with the straps 86 extending through the other thin portions of the receptacle. In this position, the cover readily accommodates a pair of the boxes 62. The cover also has thin portions 96 to receive bar hangers.

The covers can also be used for other boxes such as telephone junction boxes and thermostats.

Various modifications of the above described embodiments of the invention will be apparent to those skilled in the art and it is to be understood that such modifications can be made without departing from the scope of the invention, the embodiments shown and described being primarily for purposes of illustration and not limitation.

We claim:

1. In combination, a metal electrical box having an open face, a cover of flexible plastic material having a receptacle extending around and enclosing the back and at least portions of the sides of said box and forming an air and vapor barrier around said box, said cover leaving the open face of said box uncovered, said cover having a slanted flange around the perimeter near the open face of said box and having a slanted front surface extending outwardly therefrom and slanting away from said cover, whereby the peripheral edge of the flange can tightly contact the back surface of a wall or the like around the open face of the box, said cover providing a barrier to prevent water from entering the outlet box through the sides and back thereof, and said cover having means by which the open face of said electrical box can extend beyond said slanted flange by varying distances.

2. The combination according to claim 1 wherein said last-named means comprises a curved portion extending completely around the perimeter of said receptacle and connecting said receptacle to said slanted flange.

3. The combination according to claim 1 characterized by said last-named means comprising a hollow projection structurally integral with said receptacle and adapted to receive a fastening flange extending rearwardly from the electrical box, with the fastening flange extending into the projection by predetermined amounts to vary the extent to which the open face extends beyond the slanted flange.

4. The combination according to claim 1 characterized by said last-named means comprising a plurality of projections formed in said receptacle and extending toward the slanted flange cover to contact the back of the electrical box to determine the extent to which the open face extends beyond the slanted flange.

5. The combination according to claim 4 characterized by said projections having shoulders to facilitate removal of parts of said projections to vary the distance the open face extends beyond the slanted flange.

6. In combination, a metal electrical box having an open face, a cover of flexible plastic material having a receptacle extending around and enclosing the back and at least portions of the sides of said box to form an air and vapor barrier around said box, said cover leaving the open face of said box uncovered, said receptacle having a curved portion therearound toward the open face of said box and further having a slanted flange beyond the curved portion, all of said flange slanting away from said box, said flange having a slanted front surface, whereby the peripheral edge of the flange can move toward and away from the open face of said box and the peripheral edge of the flange front surface can tightly contact the back surface of a wall or the like around the open face of said box.

7. The combination according to claim 6 characterized by said receptacle being molded directly on said box to be functionally integral therewith.

8. A cover for enclosing an electrical box having an open face, said cover being made of a flexible plastic material and having a receptacle of a size to fit over and enclose a substantial portion of the electrical box, said receptacle having an open side in which the electrical box is received and having a slanted flange around the perimeter of the open side and extending outwardly therefrom, all of said flange slanting away from said cover, and said receptacle having a back with a plurality of projections extending toward the open face to limit the extent to which the electrical box can be inserted in the receptacle.

9. A cover according to claim 8 characterized by said projections having intermediate shoulders thereon, whereby said projections can be cut to an intermediate length to change the extent in which the electrical box projects beyond the slanted flange of the cover.

10. A cover according to claim 8 characterized by said receptacle having thin wall areas around the perimeter at the open side and positioned to receive mounting straps.

11. A cover according to claim 10 characterized by said receptacle being rectangular and having two of said thin wall areas in each side wall.

12. A cover according to claim 8 characterized by said cover being proportioned and sized to receive a pair of electrical boxes in one position and three electrical boxes in another position.

13. In combination, a metal electrical box having an open face and a fastening flange affixed to a side wall thereof and extending therefrom in a direction away from the open face, a cover of flexible plastic material having a receptacle extending around and enclosing all sides and the back of said electrical box, said receptacle having a hollow projection extending therefrom in a position and of a size to receive the fastening flange to varying extents and to totally encompass the portion of the fastening flange which is received, said cover forming an air and vapor barrier around said box, said cover also having a slanted flange around the perimeter near the open face of said box and extending outwardly therefrom and slanting away from said box, whereby the peripheral edge of the flange can tightly contact the back surface of a wall or the like around the open face of the outlet box.

14. The combination according to claim 13 characterized by the portion of said cover located around the back of said electrical box having a centrally located recess therein.

* * * * *